United States Patent [19]

Reipliner

[11] Patent Number: 4,497,387

[45] Date of Patent: Feb. 5, 1985

[54] TRANSFORMER WITH SMOOTH-WALLED TANK

[75] Inventor: Erich Reiplinger, Nuremberg, Fed. Rep. of Germany

[73] Assignee: Transformatoren Union Aktiengesellschaft, Stuttgart, Fed. Rep. of Germany

[21] Appl. No.: 413,750

[22] Filed: Sep. 1, 1982

[30] Foreign Application Priority Data

Sep. 7, 1981 [DE] Fed. Rep. of Germany ....... 3135420

[51] Int. Cl.[3] .............................................. H02K 5/24

[52] U.S. Cl. .................................... 181/202; 336/90; 336/100

[58] Field of Search .............. 181/200, 202, 210, 284; 336/100, 90, 98

[56] References Cited

U.S. PATENT DOCUMENTS

| | | | |
|---|---|---|---|
| 3,270,305 | 8/1966 | Glassano | 181/198 X |
| 4,226,299 | 10/1980 | Hansen | 181/210 X |

*Primary Examiner*—Benjamin R. Fuller

*Attorney, Agent, or Firm*—Herbert L. Lerner; Laurence A. Greenberg

[57] ABSTRACT

Transformer having an active part thereof disposed in an oil-filled, smooth-walled tank having side walls braced by ribs secured by welding and subdivided into wall-high panels, the panels, respectively, including a sheetmetal wall having a resonance frequency $f_o$ smaller according to the function $f_o=(S \cdot k_f)/B^2$ then twice line frequency, wherein S is the thickness of the sheetmetal in cm, B the net panel width in cm, and $k_f$ a constant having an absolute magnitude which depends upon the length-to-width ratio of the panel, upon the modulus of elasticity, upon the transverse contraction and upon the specific gravity of the material used therefor.

6 Claims, 2 Drawing Figures

TRANSFORMER WITH SMOOTH-WALLED TANK

SPECIFICATION

Figure 1:
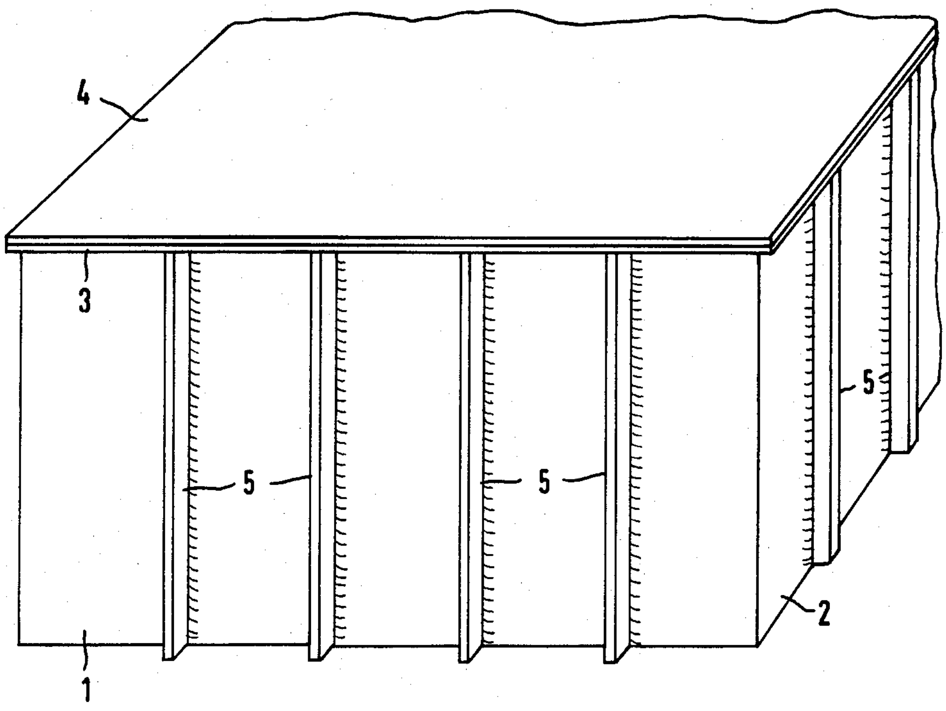

The invention relates to transformers and especially to such transformers having an active part in an oil-filled smooth-walled tank, the side walls of which are subdivided into wall-high panels and are braced by ribs welded thereon.

Such smooth-walled tanks are generally used in large transformers. To cool the coolant in these transformers, radiators are provided either on the outer sides and/or end faces of the transformer tank, or a cooling device which is integrated into a special structural unti is used for this purpose.

Regardless of the type of cooling, the tanks for these large transformers are designed from the viewpoint of strength and ruggedness, however, for reasons of economy and for lowering the shipping weight, minimization of the wall thickness of the metal plates or sheets used is striven for. For this purpose, a great number of ribs for stiffening the relatively large-area side walls of the transformer tank is provided.

A consequent disadvantage is that, due to the desired light-weight construction, the side walls of the tank have relatively high resonance frequencies and, furthermore, vibrations occurring in the tank side walls are damped only very slightly even for large amplitudes. Because of this, transformers with tanks constructed in this manner may act as noise radiators relatively often and, moreover, with somewhat unexpectedly high noise levels.

It is accordingly an object of the invention to provide a transformer with a smooth-walled tank which has an economical construction ensuring that resonance vibrations of the tank side walls with the transformer core are avoided and that, in addition, the vibrations generated by the transformer core are radiated via the side walls of the tank only after having been damped.

With the foregoing and other objects in view, there is provided in accordance with the invention, a transformer having an active part thereof disposed in an oil-filled, smooth-walled tank having side walls braced by bars or ribs secured by welding and subdivided into wall-high panels, the panels, respectively, comprising a sheetmetal wall having a resonance frequency $f_o$ smaller, according to the function $$f_o=(S\cdot k_f)/B^2$$

than twice the line frequency, wherein S is the thickness of the sheetmetal in cm, B the net panel width in cm, and $k_f$ a constant having an absolute magnitude which depends upon the length-to-width ration of the panel, upon the modulus of elasticity, upon the transverse contraction and upon the specific gravity of the material used therefor.

In accordance with other advantageous features of the invention, the panels have a minimum width of 50 cm, and the sheetmetal having a thickness of at least 1.2 cm forms the side walls, respectively, of the tank at least in the region of wall-high panels.

In accordance with further features of the invention, the width of the wall-high panels is equal to twice the width of radiators arranged on the side walls, and the side walls are assembled of panel-wide elements having vertical edges which are engled-off outwardly for forming the bars or ribs, the bars or ribs of mutually adjacent panel-wide elements forming a profile of V-shaped cross sections.

The inventive construction of tank side walls for transformer tanks is very advantageous because it leads, in the end result, to a reduction in the number of bars or ribs required for stiffening by using heavier wall thicknesses and thereby permits, practically without additional cost, the construction of transformers, having a noise radiation which is lower than for transformers of standard construction.

Other features which are considered as characteristic for the invention are set forth in the appended claims.

Although the invention is illustrated and described herein as embodied in a transformer with smooth-walled tank, it is nevertheless not intended to be limited to the details shown, since various modifications and structural changes may be made therein without departing from the spirit of the invention and within the scope and range of equivalents of the claims.

Figure 2:
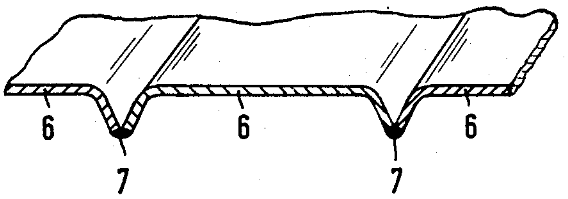

The construction and method of operation of the invention, however, together with additional objects and advantages thereof will be best understood from the following description of specific embodiments when read in connection with the accompanying drawings, in which:

FIG. 1 is a perspective view of a transformer tank with ribs welded to the side walls, in accordance with one embodiment of the invention; and FIG. 2 is a fragmentary cross-sectional view of a side wall of another embodiment of the transformer tank, assembled of wall-high elements.

Referring now to the drawings and first, particularly, to FIG. 1 thereof, there is shown, in a prismatic housing with side or edge lengths of several meters, the active parts of a transformer arranged in an otherwise non-illustrated manner. The prismatic housing is closed off laterally by side walls 1 and end walls 2. The lower edges of the side walls 1 and of end walls 2 are jointed in an oil-tight manner to an otherwise non-illustrated bottom plate. At the upper edge of the side walls 1 and the end walls 2, a flange 3 is provided on which a cover 4 is fastened, also oil-tightly, yet removably.

On the outside of the side walls 1 and the end walls 2, ribs or bars 5 for stiffening the walls 1 and 2 are welded-on by the end faces or edges thereof. The side walls 1 as well as the end walls 2 are divided by the ribs 5 into individual panels from the standpoint of vibration technology. Due to a given overdesign or superdimensioning of the sheetmetal thickness in the side walls 1 and the end wall 2, the number of the ribs 5 is relatively small and, simultaneously, the resonance frequency of the sheetmetal wall in the individual panels is lower than twice the line frequency.

FIG. 2 is a fragmentary cross-sectional view of a side wall 1 or end wall 2 assembled from panel-wide elements 6. The vertical edges of these panel-wide elements 6 are angled-off about a vertical line or inclined at an angle less than 90°. The angled-off or inclined edges of mutually adjacent elements 6 therefore form a rib of V-shaped cross section, respectively, having an outlying contact line which is closed-off by a welded seam 7. The construction of the side walls 1 and the end walls 2 out of the elements 6 permits, due to the standardization thereof, a design of the transformer tanks in accordance with the building-block principle and contributes to a more economical production due to a possible reduction of stock-keeping or storage of sheetmetal.

The foregoing is a description corresponding to German Application No. P 31 35 420.3, dated Sept. 7, 1981, the International priority of which is being claimed for the instant application, and which is hereby made part of this application. Any discrepancies between the foregoing specification and the aforementioned corresponding German application are to be resolved in favor of the latter.

I claim:

1. Transformer having an active part thereof disposed in an oil-filled, smooth-walled tank having side walls braced by ribs secured by welding and subdivided into wall-high panels, the panels, respectively, comprising a sheetmetal wall having a resonance frequency $f_o$ smaller according to the function $f_o=(S \cdot k_f)/B^2$ than twice the main electric power line frequency, wherein S is the thickness of the sheetmetal in cm, B the net panel width in cm, and $k_f$ a constant having an absolute magnitude which depends upon the length-to-width ratio of the panel, upon the modulus of elasticity, upon the transverse contraction and upon the specific gravity of the material used therefor.

2. Transformer tank according to claim 1 wherein said panels have a minimum width of 50 cm.

3. Transformer tank according to claim 1 wherein sheetmetal having a thickness of at least 1.2 cm forms the side walls, respectively, in the region of the wall-high panels.

4. Transformer tank according to claim 1 wherein the ribs secured by welding are radiators, and the width of the wall-high panels is equal to twice the width of the radiators located on the side walls.

5. Transformer tank according to claim 1 wherein the side walls are assembled of panel-wide elements having vertical edges extending outwardly at an angle therefrom for forming the ribs.

6. Transformer tank according to claim 1 wherein the side walls are formed of adjacent panel-wide elements having ribs mutually forming a profile of V-shaped cross section.

* * * * *